(12) United States Patent
Obinata et al.

(10) Patent No.: US 9,231,927 B2
(45) Date of Patent: Jan. 5, 2016

(54) INFORMATION PROCESSING APPARATUS, DATA GENERATION METHOD, INFORMATION PROCESSING METHOD, AND INFORMATION PROCESSING SYSTEM FOR UPDATING AND VERIFYING SOFTWARE PROGRAMS

(71) Applicant: Sony Computer Entertainment Inc., Tokyo (JP)

(72) Inventors: Hiroyuki Obinata, Kanagawa (JP); Yasunori Yasuda, Kanagawa (JP)

(73) Assignees: Sony Corporation, Tokyo (JP); Sony Corporation Entertainment Inc., Tokyo (JP)

( * ) Notice: Subject to any disclaimer, the term of this patent is extended or adjusted under 35 U.S.C. 154(b) by 39 days.

(21) Appl. No.: 13/804,319

(22) Filed: Mar. 14, 2013

(65) Prior Publication Data

US 2013/0311765 A1 Nov. 21, 2013

(30) Foreign Application Priority Data

May 17, 2012 (JP) .................................. 2012-113036

(51) Int. Cl.
*H04L 29/06* (2006.01)
*G06F 21/60* (2013.01)

(52) U.S. Cl.
CPC ............ *H04L 63/0457* (2013.01); *G06F 21/60* (2013.01)

(58) Field of Classification Search
CPC ........ H04L 9/0861; G06F 21/10; G06F 21/60
USPC ........................................................ 713/150
See application file for complete search history.

(56) References Cited

U.S. PATENT DOCUMENTS

| | | | |
|---|---|---|---|
| 6,694,336 B1* | 2/2004 | Multer et al. ......................... 1/1 |
| 6,847,982 B2* | 1/2005 | Parker et al. .................... 707/625 |
| 7,676,509 B2* | 3/2010 | Swanepoel et al. ........... 707/652 |
| 2004/0068658 A1* | 4/2004 | Arisaka ................ G06Q 20/401 |
| | | | 713/176 |
| 2004/0078336 A1* | 4/2004 | Asadu ............................. 705/51 |
| 2004/0098420 A1* | 5/2004 | Peng ............................. 707/203 |
| 2004/0210607 A1* | 10/2004 | Manchanda et al. .......... 707/203 |
| 2007/0100913 A1* | 5/2007 | Sumner ............... G06F 11/1453 |
| 2010/0199089 A1* | 8/2010 | Vysogorets et al. .......... 713/168 |
| 2014/0304840 A1* | 10/2014 | Ohkado .................. G06F 21/60 |
| | | | 726/31 |

\* cited by examiner

*Primary Examiner* — Izunna Okeke
*Assistant Examiner* — Bryan Wright
(74) *Attorney, Agent, or Firm* — Matthew B. Dernier, Esq.

(57) ABSTRACT

A differencing generator generates difference data between a first data set and a second data set. An encryption unit encrypts data. An electronic signature generator generates the electronic signature of data. A transmission data generator generates transmission data. The encryption unit encrypts the difference data generated by the differencing generator so as to generate encrypted difference data. The transmission data generator generates transmission data containing both the encrypted difference data generated by the encryption unit and the electronic signature of the second data set as generated by the electronic signature generator.

10 Claims, 8 Drawing Sheets

FIG.6

| | | | | | | | | | | | |
|---|---|---|---|---|---|---|---|---|---|---|---|
| 1ST DATA SET | ··· | 0 | 1 | 0 | 0 | 1 | 0 | 1 | 1 | 0 | 1 ··· |
| 2ND DATA SET | ··· | 0 | 0 | 1 | 0 | 1 | 0 | 1 | 0 | 0 | 1 ··· |
| DIFFERENCE DATA | ··· | 0 | 1 | −1 | 0 | 0 | 0 | 0 | 1 | 0 | 0 ··· |
| ENCRYPTED-AND-COMPRESSED DIFFERENCE DATA | ··· | @ | # | k | * | t | ··· | | | | |

INFORMATION PROCESSING APPARATUS, DATA GENERATION METHOD, INFORMATION PROCESSING METHOD, AND INFORMATION PROCESSING SYSTEM FOR UPDATING AND VERIFYING SOFTWARE PROGRAMS

BACKGROUND OF THE INVENTION

1. Field of the Invention

The present invention relates to a data generating method, an information processing apparatus achieving the data generating method, and an information processing system including the information processing apparatus.

2. Description of the Related Art

Recently, software develops at a rapid pace as computer hardware advances. The amount of data required to achieve an application program reaches several gigabytes to several tens of gigabytes, for instance. Some of such software may require an update after its release. Here, the updating is done for the purpose of adding data or functions and correcting or modifying a program, for instance.

When a certain data file is updated so as to generate another data file with updated content, it is generally practiced that the updated data file is sent to replace the data file before the update. However, in many cases, the updated data file is much correlated with the original data file (the data file before the update) and therefore the difference between the data file before the update and the updated data file is small. Accordingly, the delivery cost can be reduced if a difference file can be prepared and an updated data file can be produced, at a destination, from the data file before the update and the difference data file.

At the same, there may be cases where the data files before and after the update are encrypted and signed from the viewpoint of security and the like. In such a case, there is little correlation between the data file before the update and the updated one. Thus, the difference cannot be reduced even if the difference only is delivered. Note that the delivery cost must always be taken into consideration when the updated data files are to be transmitted. Transmitting and receiving the data take some extra time if the updated data whose data amount is large is to be sent in its entirety at once. Also, the communication cost for the transmission and receiving of data may increase depending on a user's communication environment.

SUMMARY OF THE INVENTION

The present invention has been made from the foregoing problems and a purpose thereof is to provide a technology that safely provides the updated data while the band in use is being suppressed.

In order to resolve the problems, one embodiment of the present invention relates to an information processing apparatus. The information processing apparatus includes: a differencing generator configured to generate difference data between a first data set and a second data set; an encryption unit configured to encrypt data; an electronic signature generator configured to generate an electronic signature of data; and a transmission data generator configured to generate transmission data. The encryption unit encrypts the difference data generated by the differencing generator so as to generate encrypted difference data, and the transmission data generator generates transmission data containing both the encrypted difference data generated by the encryption unit and an electronic signature of the second data set as generated by the electronic signature generator.

Another embodiment of the present invention relates to a data generation method. The data generation method, executable by a processor, includes: generating difference data between a first data set and a second data set; encrypting the generated difference data so as to generate encrypted difference data; generating an electronic signature of the second data set; and generating transmission data containing the encrypted difference data and an electronic signature of the second data set.

Still another embodiment of the present invention relates also to an information processing apparatus. The information processing apparatus includes: a storage configured to store a first data set; an acquiring unit configured to acquire data containing both an electronic signature of the second data set and difference data between the first data set and a second data set; a difference applying unit configured to generate a data set based on the first data set and the difference data; and a verification unit configured to verify the generated data set matches the second data set generated by the difference applying unit by using the electronic signature acquired by the acquiring unit.

Still another embodiment of the present invention relates to an information processing method. The information processing method includes: acquiring difference data between a first data set and a second data set and acquiring data containing an electronic signature of the second data set; generating a data set based on the first data set and the difference data; and verifying the generated data set matches the second data set by using the acquired electronic signature thereof.

Still another embodiment of the present invention relates to an information processing system. The information processing system includes: a server configured to store a first data set and a second data set; and an information processing apparatus, connected with the server via a network, configured to store the first data set. The server transmits difference data between the first data set and the second data set and an electronic signature of the second data set to the information processing apparatus, and the information processing apparatus verifies, by using the electronic signature received from the server, a data set to match the second data set generated in a manner such that the difference data received from the server is applied to the first data set.

Still another embodiment of the present invention relates also to an information processing method. The information processing method includes: transmitting, by a processor of a first information processing apparatus that stores first data set and second data set, difference data between a first data set and a second data set and an electronic signature of the second data set to a second information processing apparatus, which stores the first data set, via a network; and verifying, by a processor of the second information processing apparatus, a data set to match the second data set generated in a manner such that the difference data received from the first information processing apparatus is applied to the first data set, by using the electronic signature received from the second information processing apparatus.

Still another embodiment of the present invention is a program, for any of steps in the above-described methods, executable by a computer.

This program may be provided as part of firmware, for performing a basic control of hardware resources such as a decoder of videos and audios, which is incorporated into a device. This firmware is stored, for example, in a semiconductor memory such as ROM (Read Only Memory) or flash memory in the device. A computer-readable medium encoded with said program may be provided in order to offer such a firmware or to update a part of the firmware. Also, the program may be transferred over a communication line.

Optional combinations of the aforementioned constituting elements, and implementations of the invention in the form of methods, apparatuses, systems, computer programs, data structures, recording media that store the programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 6 schematically shows data processed by a server according to an embodiment;

DETAILED DESCRIPTION OF THE INVENTION

The invention will now be described by reference to the preferred embodiments. This does not intend to limit the scope of the present invention, but to exemplify the invention.

The embodiments of the present invention will be now outlined. In the embodiments of the present invention, a plurality of different information processing apparatuses have the same digital data. Assume herein, for example, that there are two different information processing apparatuses. One of the information processing apparatuses (first information processing apparatus) now has new digital data that has been updated over the original digital data it has. This first information processing apparatus, which has the new digital data, transmits not only difference data between the new digital data and the digital data before an update but also an electronic signature of the new data to the other of the information processing apparatuses (second information processing apparatus). The second information processing apparatus updates the original digital data and creates new digital data based on the difference data sent from the first information processing apparatus, and verifies the validity of the electronic signature of the new digital data sent from the first information processing apparatus.

Figure 1:
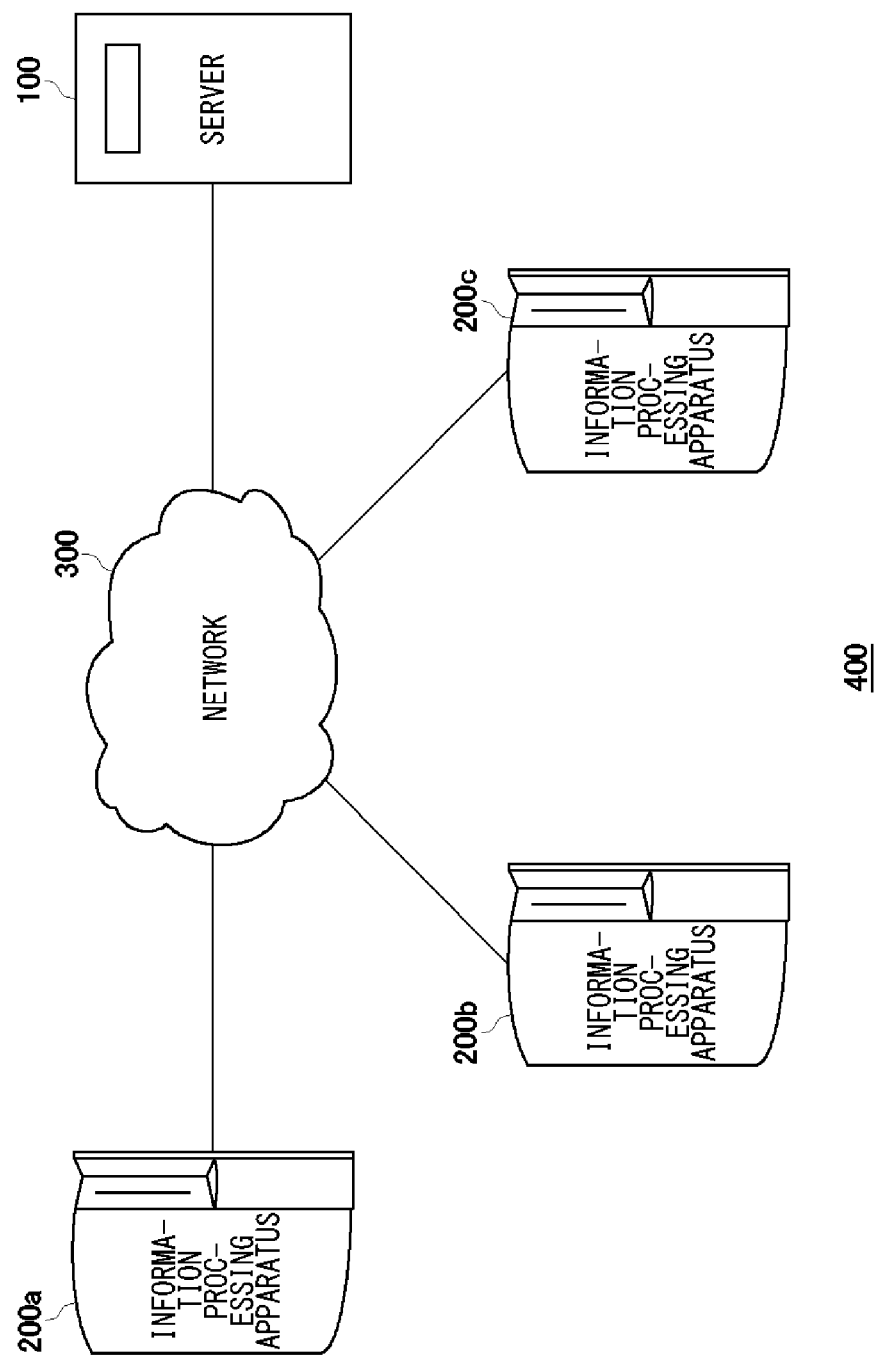
FIG. 1 is a schematic illustration of a general structure of an information processing system according to an embodiment.

FIG. 1 is a schematic illustration of a general structure of an information processing system 400 according to an embodiment. The information processing system 400 according to the present embodiment includes a server 100 and one or a plurality of information processing apparatuses 200 connected to the server 100 via a network 300. In the example shown in FIG. 1, three information processing apparatuses 200a, 220b, and 200c are shown but the number of information processing apparatuses 200 is not limited to three and may be more than or less than three. Hereinbelow, a plurality of information processing apparatuses 200 will be generically referred to as "information processing apparatuses 200" or simply "information processing apparatus 200" unless they must be distinguished from one another for a particular purpose. The information processing apparatus 200 may be a stationary game device, a mobile game device, or the like.

The server 100 stores software, such as game applications, which are executable by the information processing apparatuses 200, in a digital format. Users of the information processing apparatuses 200 obtain digital data by downloading the digital data from the server 100 or another server via the network 300 or purchasing the recording media that store the digital data and then installing them. Thus in an information processing system 400 according to the present embodiment, both the server 100 and the information processing apparatus 200 have the same digital data (hereinafter referred to as a "first data set" or "first data").

A first data set may be an office suite including a document creation and a spreadsheet, a basic software such as an operating system and firmware, or game applications, for instance. Such software may be updated for the purpose of adding and changing data and functions or modifying them, for instance. These updates are oftentimes effected online via the network 300. When particularly a game application requiring a dedicated hardware for execution of it is to be updated, the supplier of the game application may sometimes commission a server's administrator, who manages a server, to take care of software to be updated. Hereinbelow, digital data obtained after the first data set has been updated is referred to as a "second data set" or "second data".

The data size in the operating system and game applications may exceed several gigabytes and in such a case there may be cases where it takes a bit longer time to update the first data set into the second data set. Also, the communication fee may be charged at a metered rate depending on a user's network environment of the information processing apparatus 200 or depending on a country or some specific location. In that case, the communication bill may rise up just to update the first data set into the second data set, which may be of some burden to the user. In the light of this, the server 100 according to the present embodiment transmits the difference data between the first data set and the second data set to the information processing apparatuses 200 that have the first data sets. Each information processing apparatus 200 generates a second data set based on the first data set and the difference data acquired from the server 100 so as to update the first data set into a second data set.

Figure 2:
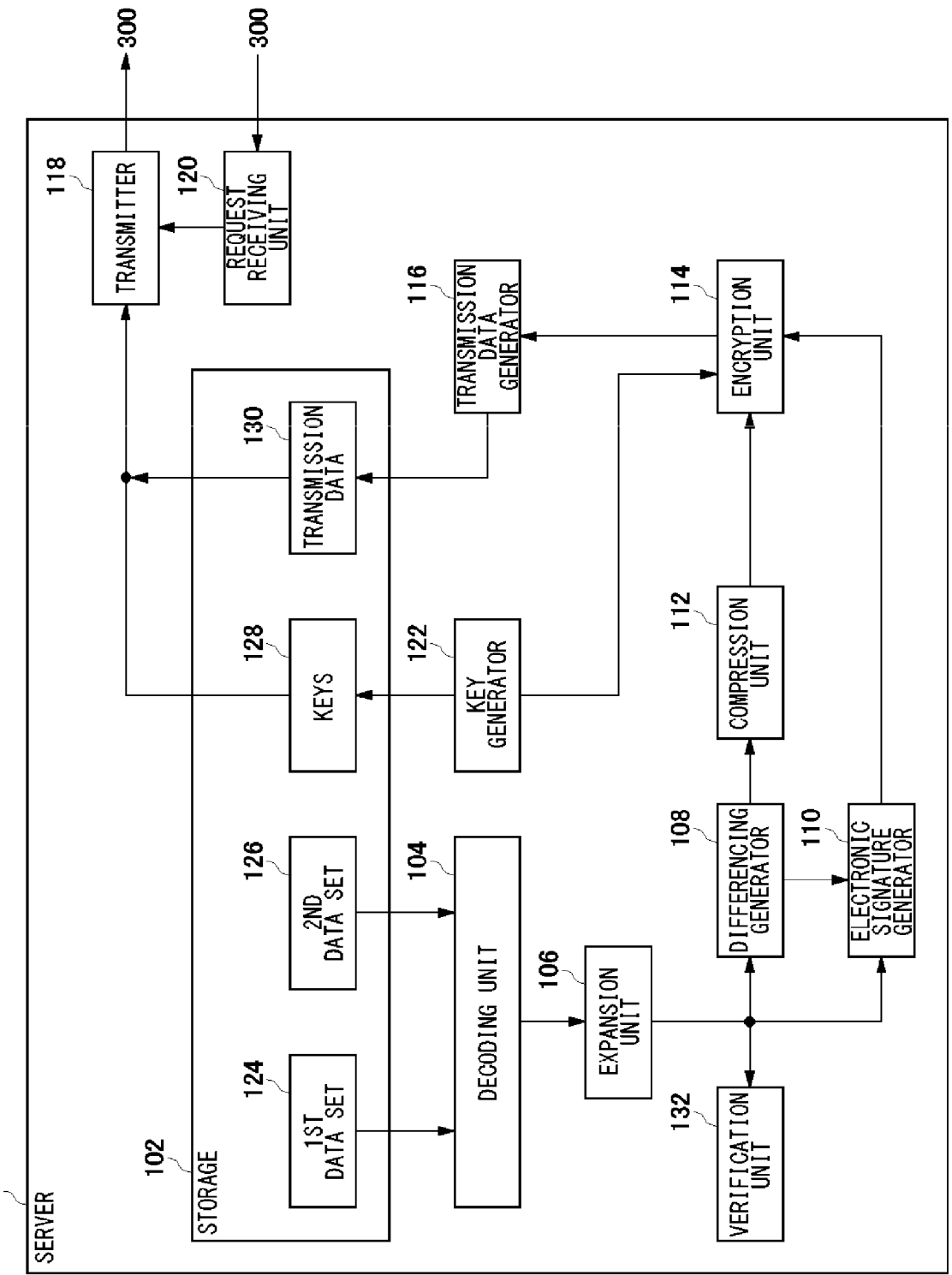
FIG. 2 schematically shows an internal structure of a server according to an embodiment.

FIG. 2 schematically shows an internal structure of the server 100 according to an embodiment. The server 100 according to the present embodiment includes a storage 102, a decoding unit 104, an expansion unit 106, a differencing generator 108, an electronic signature generator 110, a compression unit 112, an encryption unit 114, a transmission data generator 116, a transmitter 118, a request receiving unit 120, a key generator 122, and a verification unit 132.

The storage 102 stores information required for an update process carried out by the server 100. More specifically, the information stored in the storage 102 includes a first data set 124, a second data set 126 in which the first data set 124 has been updated, and transmission data 130 to be transmitted to the information processing apparatuses 200. Where encrypted data compatible with a public key scheme is used as the transmission data 130, the storage 102 also stores encryption keys 128 each composed of a pair of a secrete key and a public key.

It is to be noted here that the storage 102 may be configured such that data is stored after it has been encrypted. This protects secrecy of information in the event that the data stored in the storage 102 should be leaked out to a third party. Also, the storage 102 may be configured such that data is stored after it has been compressed. This allows the data capacity to be used efficiently. Further, the storage 102 may be configured such that data is stored after it has been both encrypted and compressed. In this case, data is preferably compressed before it is encrypted. This is because the encryption of data results in an increased entropy of data and therefore the subsequent compression efficiency deteriorates. Thus, "compression and encryption" means hereinafter that data is first compressed and then the compressed data is encrypted.

If at least one of the first data set 124 and the second data set 126 is encrypted, the decoding unit 104 will decode the encrypted data and generate plaintext data. If at least one of the first data set 124 and the second data set 126 is compressed, the expansion unit 106 will expand the compressed data. Thus, if the first data set 124 and the second data set 126 are not encrypted, there will be no need to use the decoding unit 104. Similarly, if the first data set 124 and the second data set 126 are not compressed, there will be no need to use the expansion unit 106. In this respect, the decoding unit 104 and the expansion unit 106 are not indispensable components for the server 100 according to the present embodiment but are useful if provided in terms of maintaining secrecy of data and efficiently using the storage 102. The verification unit 132 verifies the first data set 124 and the second data set 126 by use of the not-shown respective verifying signature data for the first data set 124 and the second data set 126.

The differencing generator 108 generates difference data between the plaintext data of the first data set 124 and the plaintext data of the second data set 126. The electronic signature generator 110 produces an electronic signature of the data using a secret key. The data for which the electronic signature generator 110 generates the electronic signature is the plaintext data of the second data set 126, for instance. For example, the electronic signature generator 110 may generate a hash value of data to produce the electronic signature of the data. A hash value of data may be generated by use of a known hash generation algorithm such as SHA-1 (Secure Hash Algorithm-1), SHA-2, or MD 5 (Message Digest Algorithm 5).

The compression unit 112 compresses the difference data generated by the differencing generator 108. The compression unit 112 can compress data by use of a known data compression algorithm such as RLE (Run-Length Encoding) or Huffman coding. The compression unit 112 is not an indispensable component for the server 100 according to the present embodiment. However, provision of the compression unit 112 is advantageous in terms of suppressing the band-in-use of the network 300 because the data size can be reduced by compressing the transmission data to be sent to the information processing apparatus 200.

The encryption unit 114 encrypts data. More specifically, the encryption unit 114 encrypts the compressed difference data, which is obtained after the difference data is generated by the differencing generator 108 and then compressed by the compression unit 112, thereby producing encrypted-and-compressed difference data. The electronic signature generator 110 generates an electronic signature of the second data set 126.

The transmission data generator 116 generates transmission data 130 to be sent to the information processing apparatus 200 and then stores the thus generated transmission data 130 in the storage 102. More specifically, the transmission data generator 116 generates transmission data 130 that contains the encrypted-and-compressed difference data generated by the encryption unit 114 and the electronic signature of the second data set 126 generated by the electronic signature generator 110. For the transmission data 130 generated by the transmission data generator 116, it is only necessary that the encrypted-and-compressed difference data and the electronic signature are associated with each other. Thus, the transmission data 130 may be, for example, a combined data file obtained when an electronic signature is stored in a header region of the encrypted-and-compressed difference data or two separated data files.

The transmitter 118 transmits the transmission data 130, which is generated by the transmission data generator 116 and is then stored in the storage 102, to the information processing apparatuses 200. Note here that the first data set 124 may be transmitted to an information processing apparatus 200, among the information processing apparatuses 200, which has the first data set 124. In order to achieve this, the request receiving unit 120 receives a data transmit request from the information processing apparatus 200 that holds the first data set 124. If the request receiving unit 120 receives the data transmit request from the information processing apparatus 200 that holds the first data set 124, the transmitter 118 will transmit transmission data 130 to said information processing apparatus 120. The request receiving unit 120 can verify that the information processing apparatus 200 that has requested the transmission of data has the first data set 124, by employing the following method. Such a method employed by the request receiving unit 120 may be acquiring an electronic signature and/or a hash value from the information processing apparatus 200 or acquiring an identifier that uniquely identifies a recording medium storing the first data set 124, for instance.

This prevents the transmission data 130 for use in the update, for the first data set 124, which is not necessary for the information processing apparatuses 200 that do not hold the first data set 124 from being transmitted to those unwanted information processing apparatuses 200. Also, this suppresses the band-in-use of the network 300. Also, this restricts the destinations of data, which is advantageous in that an ill-disposed third party trying to falsify the data, for instance, is less likely to acquire the transmission data 130.

If the server 100 and the information processing apparatus 200 are to transmit and receive data using an encryption method that employs a public key scheme, the key generator 122 will generate a secret key and a public key used for encryption and decoding. The key generator 122 uses a known algorithm such as an RSA encryption or an elliptic curve encryption. Now assume that the server 100 and the information processing apparatus 200 transmit and receive data using an encryption method that employs a common key scheme only. In this case, common keys in the information processing apparatus 200 are stored in a safe storage area (not shown), having a tamper resistance, in a period during which the common keys are least likely to be accessed from outside (e.g., during a process of manufacturing the information processing apparatus 200).

Figure 3:
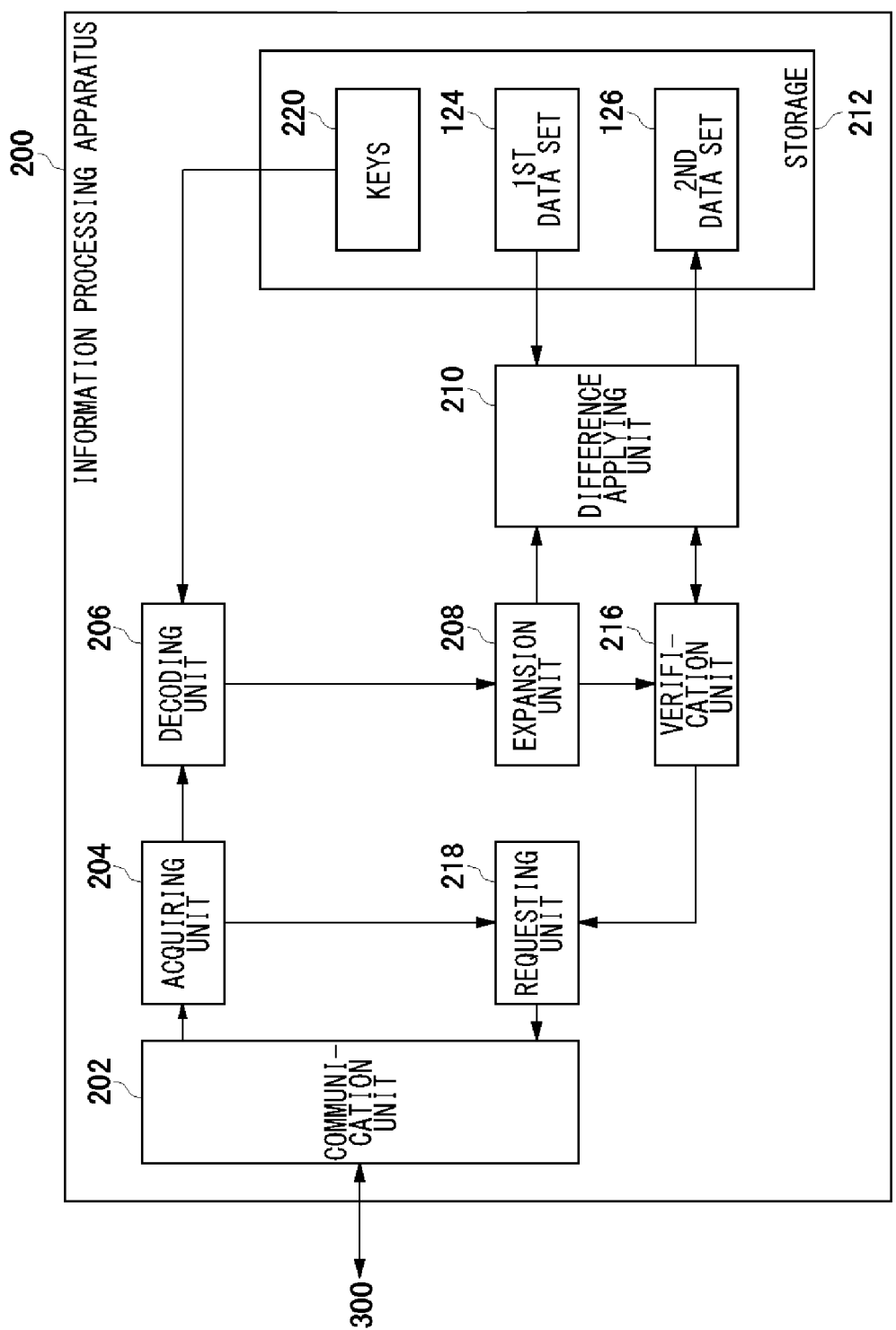
FIG. 3 schematically shows an internal structure of an information processing apparatus according to an embodiment.

FIG. 3 schematically shows an internal structure of an information processing apparatus 200 according to an embodiment. The information processing apparatus 200 according to the present embodiment includes a communication unit 202, an acquiring unit 204, a decoding unit 206, an expansion unit 208, a difference applying unit 210, a storage 212, a verification unit 216, and a request receiving unit 218.

The communication unit 202 is a communication interface to communicate between the information processing apparatus 200 and the network 300. The communication unit 202 may be achieved by employing a known communication technology such as a LAN (Local Area Network) card and a Wi-Fi (registered trademark) module, for instance. The request receiving unit 24 checks with the server 100, via the communication unit 202, whether or not there is data for which the first data set 124 is updated into a second data set 126. If there is an update to be effected on the first data set 124, the request receiving unit 218 makes a request to the server 100 for such data for the update. The acquiring unit 204 acquires data including both the difference data between the first data set 124 and the second data set 126 and the electronic signature of the second data set 126 from the server 100 via the communication unit 202.

If the data acquired by the acquiring unit 204 has been encrypted, the decoding unit 206 decodes the data and generates plaintext data. If the data acquired by the acquiring unit 204 has been compressed, the expansion unit 208 expands the data.

The storage 212 stores information required for an update process carried out by the information processing apparatus 200. More specifically, the first data set 124 and a decryption key 220 used to decode the data are stored in the storage 212. The storage 212 also stores a second data set 126 generated by the difference applying unit 210 described later.

The difference applying unit 210 generates a second data set 126 based on the first data set 124 stored in the storage 212 and the difference data acquired by the acquiring unit 204.

The verification unit 216 verifies the second data set 126 generated by the difference applying unit 210, using the electronic signature generated by the electronic signature generator 110 in the server 100.

Here, at least two factors listed as follows may be responsible for a failed verification at the verification unit 216, if any.

A first reason is that the difference data changes, during a transmission from the server 100 to the information processing apparatus 200, due to a communication error, falsification by a third party and so forth. If the difference data has changed, the second data set 126 generated by the difference applying unit 210 in the information processing apparatus 200 differs from the second data set 126 in the server 100 and as a result the both of their electronic signatures differ from each other.

A second reason is that some sort of error has occurred when the difference applying unit 210 in the information processing apparatus 200 generates the second data set 126. The error occurs, for example, if there is a bug in an algorithm used when the difference applying unit 210 applies the difference data to the first data set 124 or if memory error occurs in memory used when the algorithm is applied and thereby a part of data changes. In such cases, too, a second data set 126 generated by the difference applying unit 210 in the information processing apparatus 200 differs from the second data set 126 in the server 100 and as a result the both of their electronic signatures differ from each other. It goes without saying that the verification by the verification unit 216 fails if the first cause and the second cause occur simultaneously.

Attention must be directed to the fact that a second data set 126 generated by the difference applying unit 210 is not the data set transmitted from the server 100. The verification unit 216 does not verify the difference data sent from the server 100 but verifies the second data set 126 generated by the difference applying unit 210 in the information processing apparatus 200. Thereby, not only a change in the data set during the transmission but also error occurring when the difference is being applied can be detected through one-time verification by the verification unit 216.

If the verification by the verification unit 216 has been successful, the difference applying unit 210 stores the generated second data set 126 in the storage 212. If the verification has failed, the verification unit 216 may have the request receiving unit 218 make a request again to the server 100 for data for the update.

Though not only a change in the data during the transmission but also error occurring when the difference is being applied can be detected through one-time verification by the verification unit 216, it is difficult to distinguish the cause of the verification failure between the first cause and the second cause. Thus, an electronic signature of the difference data is contained in the data that the server 100 transmits to the information processing apparatus 200, so that the cause of the verification failure can be distinguished easily. The principle of how this works is described hereunder.

Referring now back to the explanation of FIG. 2, the electronic signature generator 110 in the server 100 generates an electronic signature of the difference data generated by the differencing generator 108 as well. When the compression unit 112 is to compress the data, the electronic signature generator 110 may generate an electronic signature of the compressed difference data generated by the compression unit 112 in place of that of the difference data generated by the differencing generator 108. It is easily understood by persons having ordinary skill in the art that the present embodiment works fine either way.

The transmission data generator 116 generates the transmission data 130 by including the electronic signature of the difference data generated by the electronic signature generator 110 as well.

Referring now back to the explanation of FIG. 3, the acquiring unit 204 in the information processing apparatus 200 acquires from the server 100 data containing the electronic signature of the difference data. If the verification of the second data set 126 by the verification unit 216 has failed, the verification unit 216 verifies the difference data acquired by the acquiring unit 204 using the electronic signature acquired by the acquiring unit 204 from the server 100.

If the verification of the difference data has been successful, it is highly probable that the failure of the second data set 126 is caused by the aforementioned second reason. If the verification of the difference data has been failed, at least the aforementioned first reason accounts for its success. As described above, the cause of the verification failure can be distinguished therebetween by including the electronic signature of the difference data in the data that server 100 transmits to the information processing apparatus 200.

As described above, it is when the verification of the second data set 126 by the verification unit 216 has failed that the verification unit 216 first verifies the difference data. That is, the verification unit 216 does not verify the difference data when the verification of the difference data by the verification unit 216 has been successful. This achieves high-speed processing of update and suppresses the power consumption.

Figure 4:
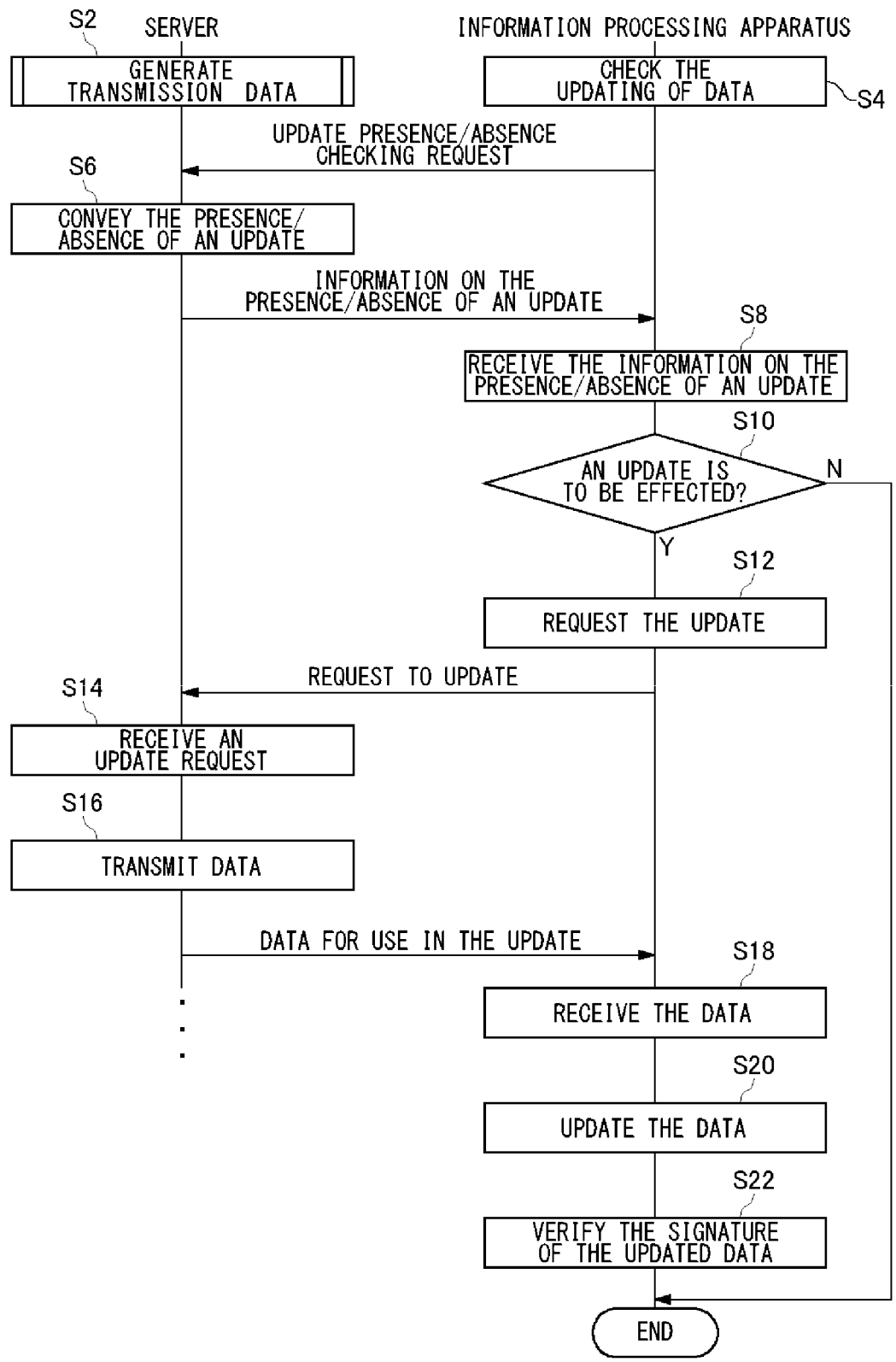
FIG. 4 is a sequence diagram showing a flow of an updating process carried out by an information processing system according to an embodiment.

FIG. 4 is a sequence diagram showing a flow of an updating process carried out by the information processing system 400 according to an embodiment.

The server 100 generates transmission data 130 with which to update the first data set 124 and thereby generate a second data set 126 (S2). The request receiving unit 218 in the information processing apparatus 200 transmits an update presence/absence checking request (a request to check the presence/absence of an update) by which to verify whether or not there is data, used to update the first data set 124 into a second data set 126, in the server 100 (S4). Upon receipt of the update presence/absence checking request from an information processing apparatus 200, the request receiving unit 120 in the server 100 conveys the information on the presence/absence of an update to said information processing apparatus 200 that has sent the request (S6).

The acquiring unit 204 in the information processing apparatus 200 receives information on the presence/absence of an update from the server 100 (S8) and conveys its content of the information to the request receiving unit 218. If there is an update to be effected on the first data set 124 (Y of S10), the request receiving unit 218 requests the server 100 to update the data (S12). As the request receiving unit 120 in the server 100 receives an update request from the information processing apparatus 200 (S14), the transmitter 118 transmits transmission data 130 for use in the update (hereinafter referred to as "updating transmission data 130" also) to the information processing apparatus 200 that has requested the updating of the first data set 124 (S16).

The communication unit 202 in the information processing apparatus 200 receives the transmission data 130 from the server 100 (S18), and the difference applying unit 210 applies the difference data, contained in the transmission data 130, to the first data set 124 so as to update the first data set 124 (S20). The verification unit 216 verifies the validity of signature of a second data set 126 that has been generated as a result of the update of the first data set 124 by the difference applying unit 210 (S22). Note that "verifying the validity of signature of the second data set" means that the second data set 126 generated by the difference applying unit 210 is verified using the electronic signature of the second data set 126 acquired from the server 100.

If the verification unit 216 has verified the validity of signature of the second data set or if there is no update in the first data set 124 (N of S10), the updating process in the information processing apparatus 200 will be completed.

Figure 5:
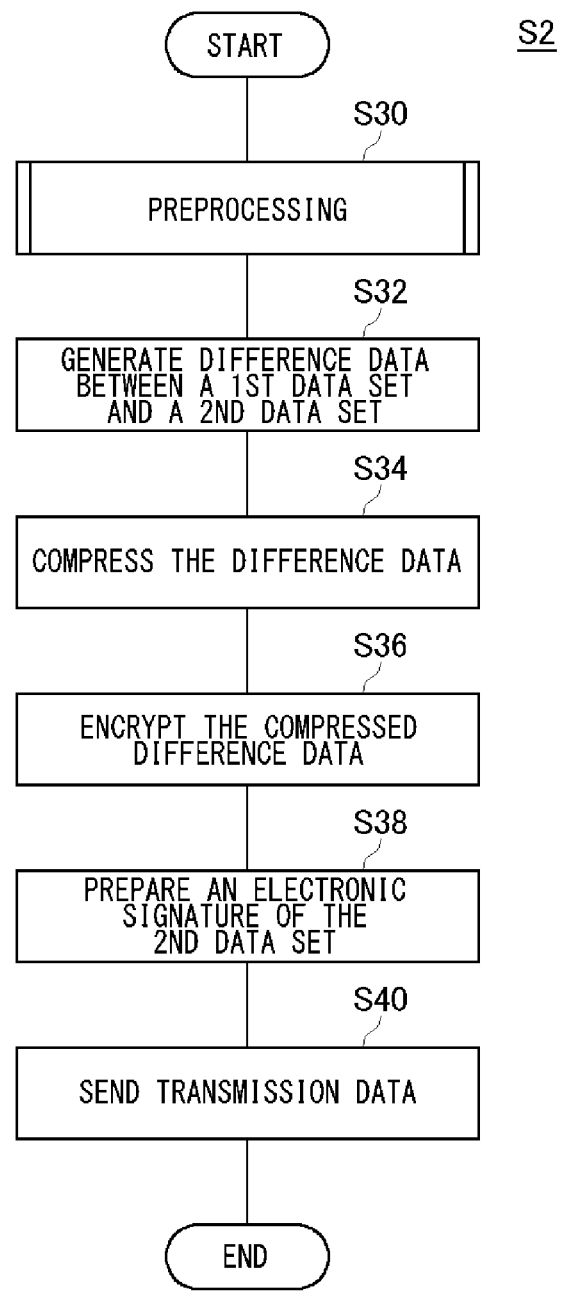
FIG. 5 is a flowchart explaining a flow of a process for generating transmission data carried out by a server according to an embodiment.

FIG. 5 is a flowchart explaining a flow of a process for generating transmission data 130 carried out by the server 100 according to an embodiment.

Each component in the server 100 performs preprocessing for generating the transmission data 130 (S30). A detailed flow of preprocessing will be discussed later. The differencing generator 108 generates difference data between the first data set 124 and the second data set 126 (S32). The compression unit 112 compresses the difference data generated by the differencing generator 108 and thereby generates compressed difference data (S34). The encryption unit 114 encrypts the compressed difference data generated by the compression unit 112 and thereby generates encrypted-and-compressed difference data (S36).

The electronic signature generator 110 generates an electronic signature of the second data set 126 (S38). The transmission data generator 116 generates transmission data 130 containing both the electronic signature of the second data set 126 and the encrypted-and-compressed difference data (S40).

FIG. 6 schematically shows data processed by the server 100 according to an embodiment. As described so far, the first data set 124 and the second data set 126 are both digital data sets. In FIG. 6, the first data set 124 and the second data set 126 are each indicated by a sequence of "0s" and "1s".

The differencing generator 108 according to the present embodiment arranges each of the first data set 124 and the second data set 126 in a row, for instance, and computes the differences between the corresponding digits so as to generate the difference data. If, at this time, there is a difference in the length between the first data set 124 and the second data set 126, "0s" will be padded to the shorter data or the longer data will be truncated until its length becomes equal to that of the other data, for instance. The number of 0s padded and the truncated data are part of the difference information as well.

If, in FIG. 6, the numbers in the corresponding digits between the first data set 124 and the second data set 126 are equal, the difference data associated with such digits will be "0". If, in a given digit, a number is "1" in the first data set 124 and a number corresponding to said number "1" is "0" in the second data set 126, the difference in the given digit is "1". Similarly, in another given digit, a number is "0" in the first data set 124 and a number corresponding to said number "0" is "1" in the second data set 126, the difference in this given digit is "−1".

Notice here that the second data set 126 is data obtained when the first data set 124 is updated. If data is to be updated for the purpose of adding data and function and modifying or correcting a program, for instance, a major part of data after the update is more likely to be in common with the original data. Thus, it may be expected that most of the numbers constituting the difference data computed according to the above-described method are "0s". This is because, for the digits where the numbers are the same both in the first data set 124 and the second data set 126, their corresponding difference data are "0s". The compression efficiency is generally high in data for which the same value continues, so that the difference data can be compressed efficiently.

The compressed difference data encrypted by the encryption unit 114 cannot be recognized as a meaningful data sequence unless it is decoded. FIG. 6 shows encrypted-and-compressed difference data, which is converted into data comprised of other than "0", "1", and "−1" by a process of encryption, as data shorter than the difference data.

Figure 7:
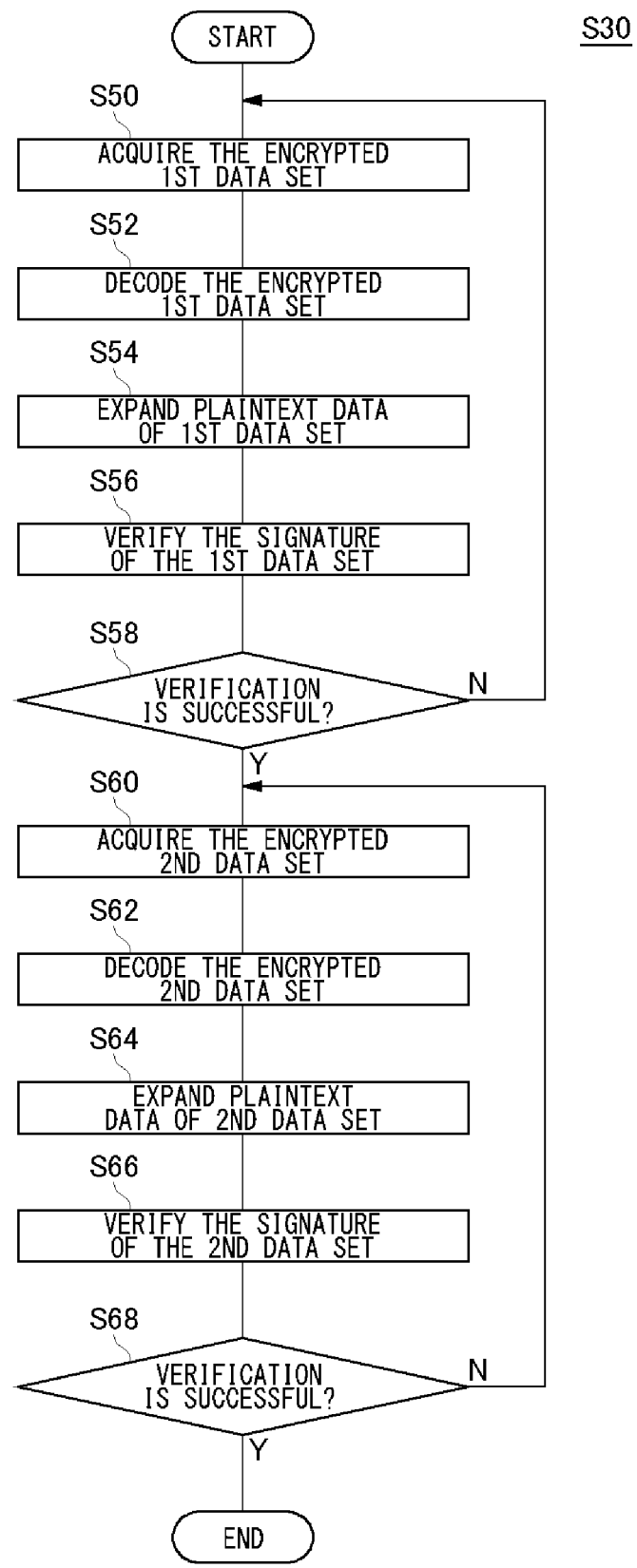
FIG. 7 is a flowchart explaining a flow of preprocessing carried out within a server according to an embodiment.

FIG. 7 is a flowchart explaining a flow of preprocessing carried out within the server 100 according to an embodiment, and FIG. 7 also explains Step S30 of FIG. 5 in detail. It is assumed in the flowchart of FIG. 7 that the first data set 124 and the second data set 126 are stored in the storage 102 of the server 100 after both the data have been compressed and encrypted.

The decoding unit 104 acquires the encrypted first data set 124 from the storage 102 (S50). The decoding unit 104 decodes the encrypted first data set 124 and generates plaintext of the first data set 124 (S52). The expansion unit 106 expands the plaintext of the first data set 124 (S54). The verification unit 132 verifies the first data set 124 that has been decoded and expanded (S56). If the verification is not successful (N of S58), the procedure will return to Step S52 and the processes of Step S52 to Step S56 will be repeated.

If the verification has been successful (Y of S58), the decoding unit 104 will acquire the encrypted second data set 126 from the storage 102 (S60). The decoding unit 104 decodes the encrypted second data set 126 and generates plaintext of the second data set 126 (S62). The expansion unit 106 expands the plaintext of the second data set 126 (S64). The verification unit 132 verifies the second data set 126 that has been decoded and expanded (S66). If the verification is not successful (N of S68), the procedure will return to Step S62 and the processes of Step S62 to Step S66 will be repeated. If the verification has been successful (Y of S68), the processings of the present flowchart will come to an end.

Figure 8:
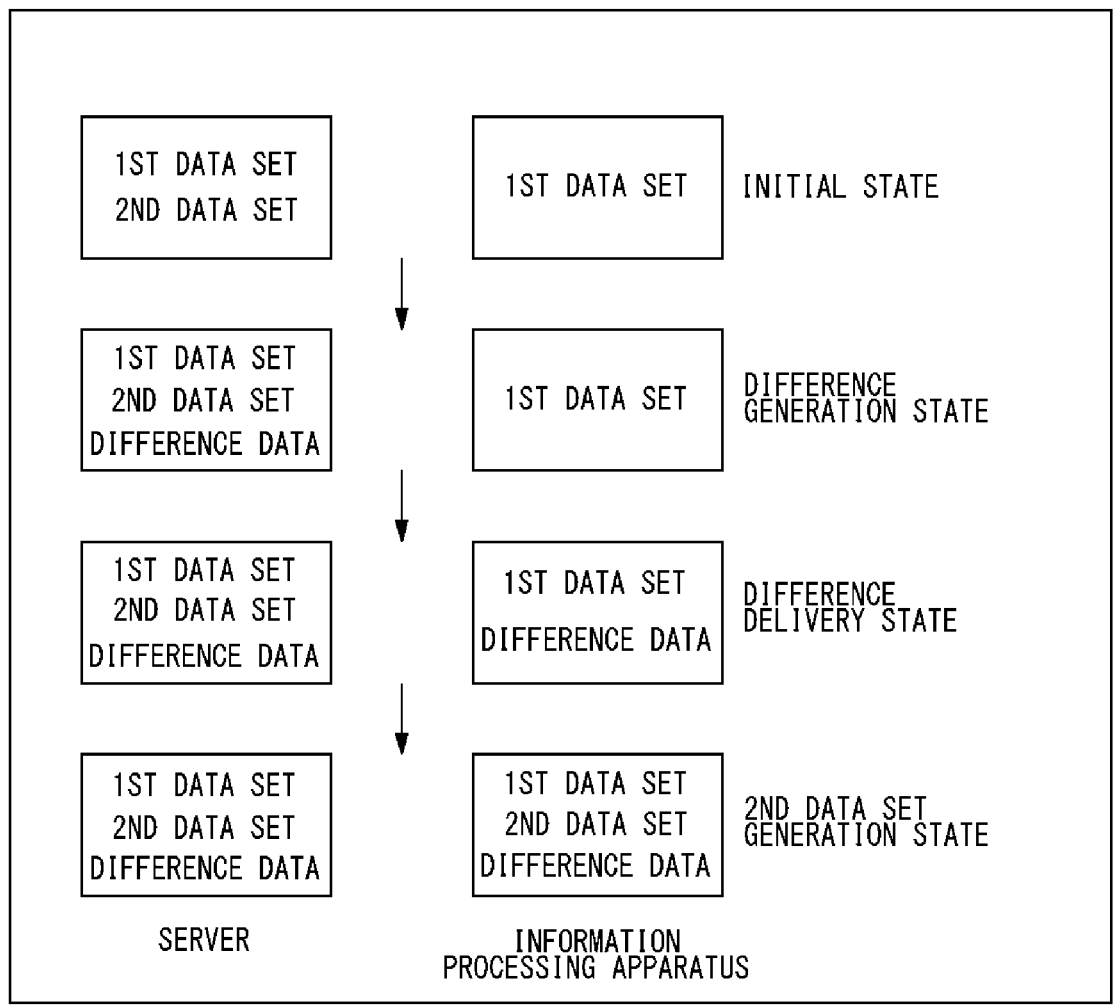
FIG. 8 illustrates a state transition of data in a server and an information processing apparatus during an updating process according to an embodiment.

FIG. 8 illustrates a state transition of data in the server 100 and the information processing apparatus 200 during an updating process according to an embodiment.

In the initial state, the server 100 has both a first data set 124 and a second data set 126 while the information processing apparatus 200 has a first data set 124 only. In the difference generation state, the difference data is added in the server 100. In the difference delivery state, the difference data is added in the information processing apparatus 200 with the result that the information processing apparatus 200 has the first data set 124 and the difference data. In the generation state of a second data set 126, the second data set 126 is generated in the information processing apparatus 200. As a result, the server 100 and the information processing apparatus 200 each has a first data set 124, a second data set 126 set and difference data.

An operation of the information processing system 400 configured as above is as follows. The server 100 holding the first data set 124 and the second data set 126 transmits the difference data between the first data set 124 and the second data set 126 and the electronic signature of the second data set 126 to the information processing apparatus 200, holding the first data set 124, which is connected to the server 100 via the network 300.

The information processing apparatus 200 applies the difference data, received from the server 100, to the first data set 124 that the information processing apparatus 200 itself has, and thereby generates a second data set 126. Also, the information processing apparatus 200 verifies the thus generated second data set 126 using the electronic signature received from the server 100. If the verification is successful, the information processing apparatus 200 can acquire a second data set 126, which is the updated data over the first data set 124, without receiving the actual second data set 126 from the server 100.

As described above, by employing the information processing system 400 according to the present embodiment, the updated data can be provided safely while the band in use is suppressed.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

(First Modification)

The above description has been given on the assumption that a second data set 126 is a new digital data set obtained when the first data set 124 is updated. However, the second data set 126 is not limited to a data set obtained when the first data set 124 is updated, and the second data set 126 may be any data set as long as the second data set 126 has a certain degree of correction with the first data set 124. For example, the first data set 124 may be a left-eye parallax image, whereas the second data set 126 may be a right-eye parallax image.

(Second Modification)

The above description has been given on the assumption that the information processing system 400 is so-called a system of server-client model such as one comprised of the server 100 and a plurality of information processing apparatuses 200 communicatable with the server 100. However, an apparatus for generating and transmitting the transmission data 130 is not limited to the server 100 in the server-client model and it may be one of a pair of information processing apparatuses 200 communicating with each other on a one-to-one peer-to-peer basis. In this respect, the server 100 may be a type of information processing apparatuses.

(Third Modification)

FIG. 1 illustrates how the information processing apparatuses 200 are connected to the server 100 via the network 300 and illustrates schematically an actual system configuration. Here, the server 100 in the information processing system 400 is not limited to a single server 100 and a cloud computing system may be configured by including a plurality of servers 100 and databases (not shown). In general, a user who uses the information processing apparatus 200 is rarely aware of the configuration of the information processing system 400 comprised of the network 300 and servers 100. From the standpoint of the users who use the information processing system 400, it is not necessary for them to understand the physical layout and the software configuration of the information processing system 400 in receiving the services. Instead, they may get an impression as if the they received the services emerging from the "cloud" of network.

In most cases, the information processing apparatus 200 has a computing resource such as CPU (Central Processing Unit) and therefore at least a part of application can also be executed in a local environment of the information processing apparatus 200. However, it does not matter to the users whether an application is executed using a local computing resource or executed using the computing resource of the cloud computing system on the network. These do not make any difference to the users in terms of the use of the service.

The information processing system 400 according to the present embodiments may be realized by using a cloud computing system. In such a case, each step performed in the above-described information processing system 400 is executed using the computing resource of the cloud computing system. Here, the "computing resource of the cloud computing system" or simply the "computing resource" corresponds to at least one of the computing resource of the information processing apparatus 200, the computing resource of the server 100 and so forth.

What is claimed is:

1. An information processing apparatus operating as a managing server on a computer network comprising a microprocessor coupled to a computer memory containing a computer program, the microprocessor operating under the control of the computer program, comprising:

a differencing generator configured to generate difference data between a first data set and a second data set;

an encryption engine configured to encrypt the difference data generated by the differencing generator so as to generate encrypted difference data;

an electronic signature generator configured to generate an electronic signature of the difference data generated by the differencing generator, and to generate an electronic signature of the second data set; and a transmission data generator configured to generate transmission data for transmission to a terminal on the network, wherein the transmission data generator generates transmission data containing the encrypted difference data generated by the encryption unit, the electronic signature of the difference data generated by the electronic signature generator, and the electronic signature of the second data set generated by the electronic signature generator.

2. An information processing apparatus according to claim 1, wherein the microprocessor operates under the control of the computer program to implement further processing elements, comprising:

a request receiver configured to receive a data transmission request from another information processing apparatus that stores the first data set; and a transmitter configured to transmit the transmission data generated by the transmission data generator to the other information processing apparatus.

3. A data generation method executable by a processor of a managing server on a computer network, the method comprising:
- generating difference data between a first data set and a second data set;
- encrypting the generated difference data so as to generate encrypted difference data;
- generating an electronic signature of the difference data and an electronic signature of the second data set; and
- generating transmission data containing the encrypted difference data, the electronic signature of the difference data, and the electronic signature of the second data set, the transmission data for transmission to a terminal on the network.

4. A non-transitory computer-readable medium encoded with a computer program, executable by a computer of a managing server on a computer network, the program comprising:
- a difference data generating module operative to generate difference data between a first data set and a second data set;
- an encryption module operative to encrypt the difference data generated by the difference data generating module so as to generate encrypted difference data;
- an electronic signature generating module operative to generate an electronic signature of the difference data, and to generate an electronic signature of the second data set; and
- a transmission data generating module operative to generate transmission data containing the encrypted difference data, the electronic signature of the difference data, and the electronic signature of the second data set, the transmission data for transmission to a terminal on the network.

5. An information processing apparatus comprising a microprocessor coupled to a computer memory containing a computer program, the microprocessor operating under the control of the computer program comprising:
- a storage configured to store a first data set;
- an acquiring unit configured to acquire data containing an electronic signature of a second data set, encrypted difference data between the first data set and the second data set, and an electronic signature of the difference data;
- a difference applying unit configured to generate a data set based on the first data set and the difference data; and
- a verification engine configured to verify the generated data set to match the second data set by using the electronic signature of the second data set acquired by the acquiring unit,
- wherein the difference data is generated by a differencinq generator of a further information processing apparatus in communication with the information processing apparatus,
- wherein the encrypted difference data is generated by an encryption engine of the further information processing apparatus, and
- wherein the electronic signature of the second data set and the electronic signature of the of the difference data are generated by an electronic signature generator of the further information processing apparatus.

6. An information processing apparatus according to claim 5, wherein:
- when the verification engine fails to verify the second data set, the verification engine verifies the difference data acquired by the acquiring unit by using the electronic signature of the difference data acquired by the acquiring unit.

7. An information processing method executable by a processor of an information processing apparatus, the method comprising:
- acquiring data containing an electronic signature of a second data set and, encrypted difference data between the a first data set and the second data set, and an electronic signature of the difference data;
- generating a data set based on the first data set and the difference data; and
- verifying the generated data set matches the second data set by using the acquired electronic signature of the second data set,
- wherein the difference data is generated by a differencinq generator of a further information processing apparatus in communication with the information processing apparatus,
- wherein the encrypted difference data is generated by an encryption engine of the further information processing apparatus, and
- wherein the electronic signature of the second data set and the electronic signature of the of the difference data are generated by an electronic signature generator of the further information processing apparatus.

8. A non-transitory computer-readable medium encoded with a computer program, executable by a computer of an information processing apparatus, the program comprising:
- an acquiring module operative to acquire data containing an electronic signature of a second data set, encrypted difference data between the a first data set and the second data set, and an electronic signature of the difference data;
- a generating module operative to generate a data set based on the first data set and the difference data; and
- a verification module operative to verify the generated data set, matches the second data set by using the electronic signature of the second data set acquired by the acquiring module
- wherein the difference data is generated by a differencinq generator of a further information processing apparatus in communication with the information processing apparatus,
- wherein the encrypted difference data is generated by an encryption engine of the further information processing apparatus, and
- wherein the electronic signature of the second data set and the electronic signature of the of the difference data are generated by an electronic signature generator of the further information processing apparatus.

9. An information processing system, comprising:
a server comprising:
a differencing generator configured to generate difference data between a first data set and a second data set,
an encryption engine configured to encrypt the difference data generated by the differencing generator so as to generate encrypted difference data,
an electronic signature generator configured to generate an electronic signature of the difference data generated by the differencing generator, and to generate an electronic signature of the second data set, and a transmission data generator configured to generate transmission data containing the encrypted difference data generated by the encryption unit, the electronic signature of the difference data generated by the electronic signature generator, and the electronic signature of the second data set generated by the electronic signature generator; and an information processing apparatus operating to receive the transmission data from the server via a network, and configured to store the first data set, wherein the information processing apparatus operates to generate a data set based on the first data set and the difference data, and the information processing apparatus verifies, by using the electronic signature of the second data set received from the server, the data set matches the second data set.

10. An information processing method, comprising:

at a first information processing apparatus: (i) generating difference data between a first data set and a second data set; (ii) encrypting the generated difference data so as to generate encrypted difference data; (iii) generating an electronic signature of the difference data and an electronic signature of the second data set; (iv) generating transmission data containing the encrypted difference data, the electronic signature of the difference data, and the electronic signature of the second data set; and (v) transmitting the transmission data to a second information processing apparatus over a network;

at the second information processing apparatus: (i) storing the first data set; (ii) receiving the transmission data via the network; (iii) generating a data set based on the first data set and the difference data, and (iv) verifying, by using the electronic signature of the second data set received over the network, the data set matches the second data set.

* * * * *